Oct. 6, 1931.     R. M. CARRIER, JR., ET AL     1,826,164
APPARATUS FOR THE GUIDING OF TOOLS IN THREE DIMENSIONS
Filed Feb. 5, 1931     4 Sheets-Sheet 1
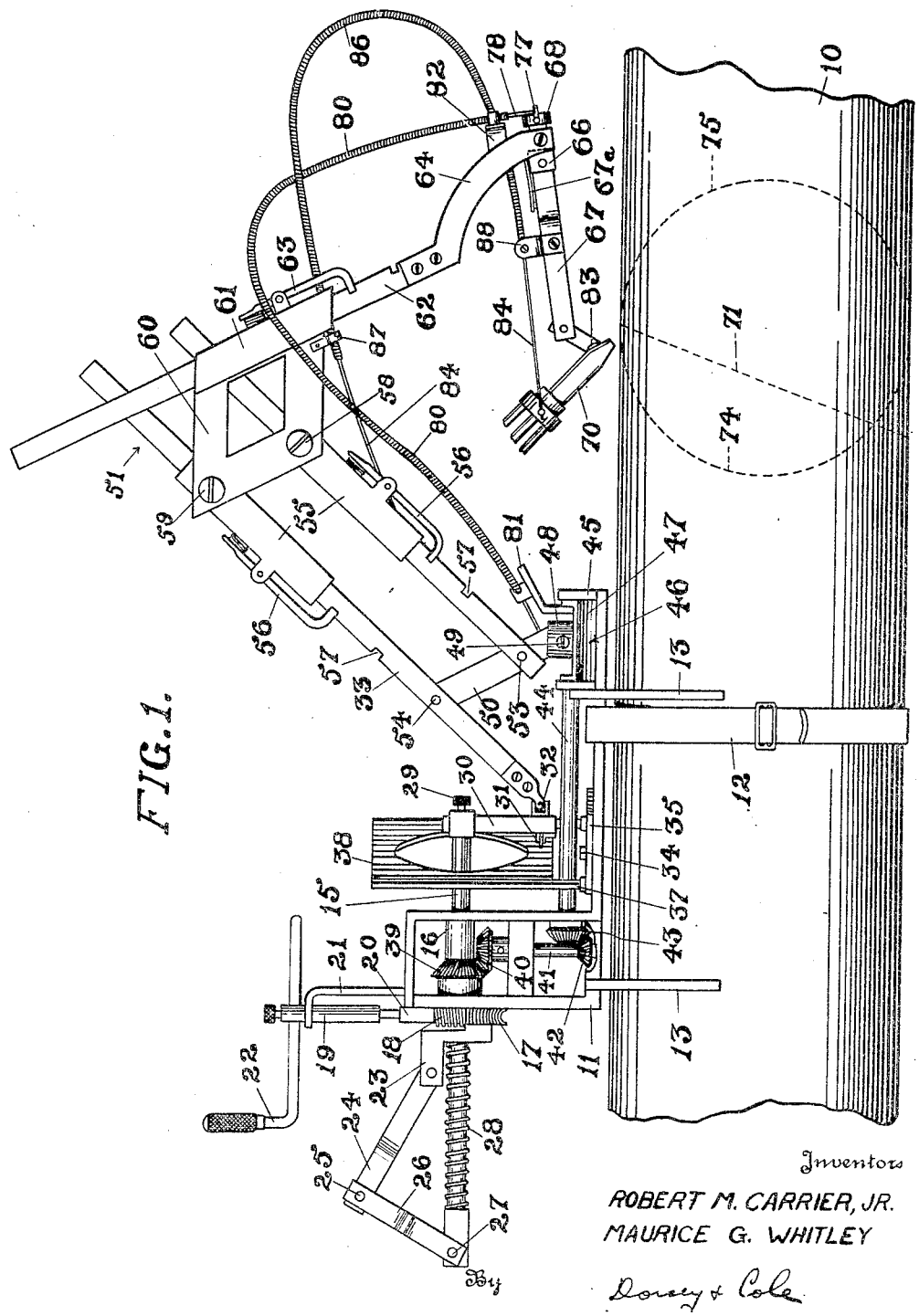
Inventors
ROBERT M. CARRIER, JR.
MAURICE G. WHITLEY
By Dorsey & Cole
Attorneys Oct. 6, 1931. R. M. CARRIER, JR., ET AL 1,826,164
APPARATUS FOR THE GUIDING OF TOOLS IN THREE DIMENSIONS
Filed Feb. 5, 1931 4 Sheets-Sheet 2
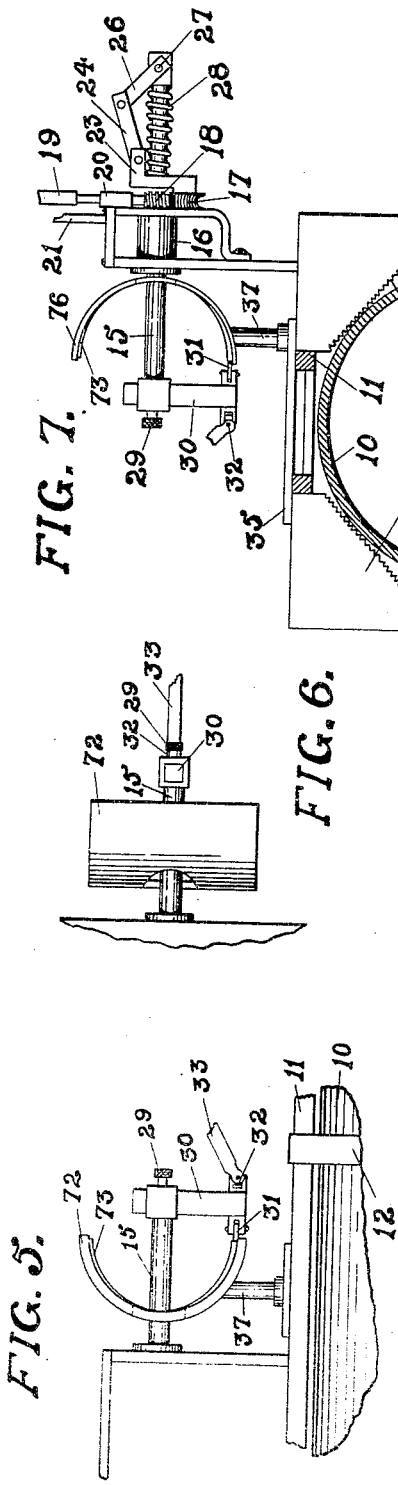
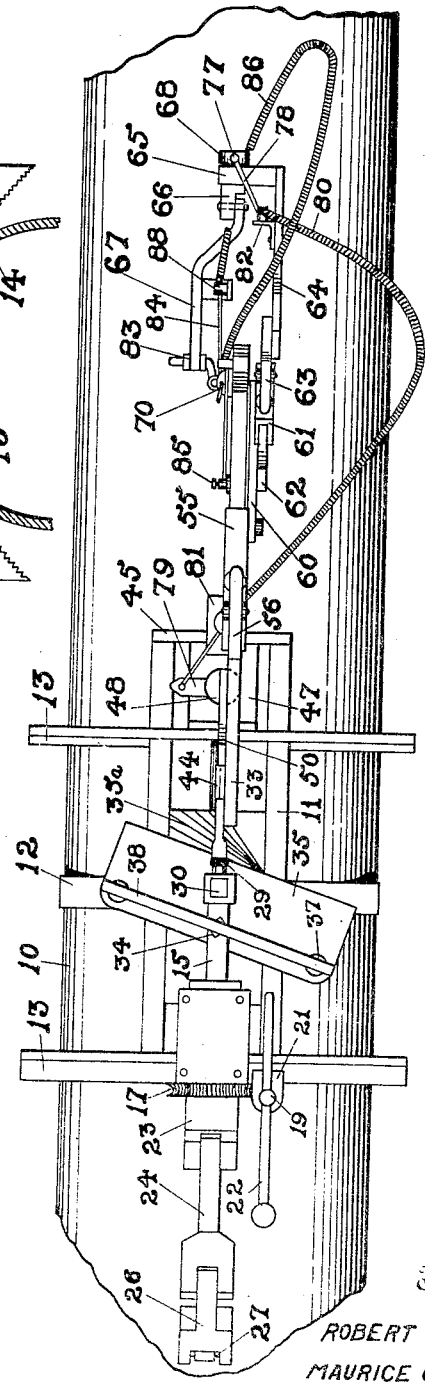
Inventors
ROBERT M. CARRIER, JR.
MAURICE G. WHITLEY
BY
Attorneys

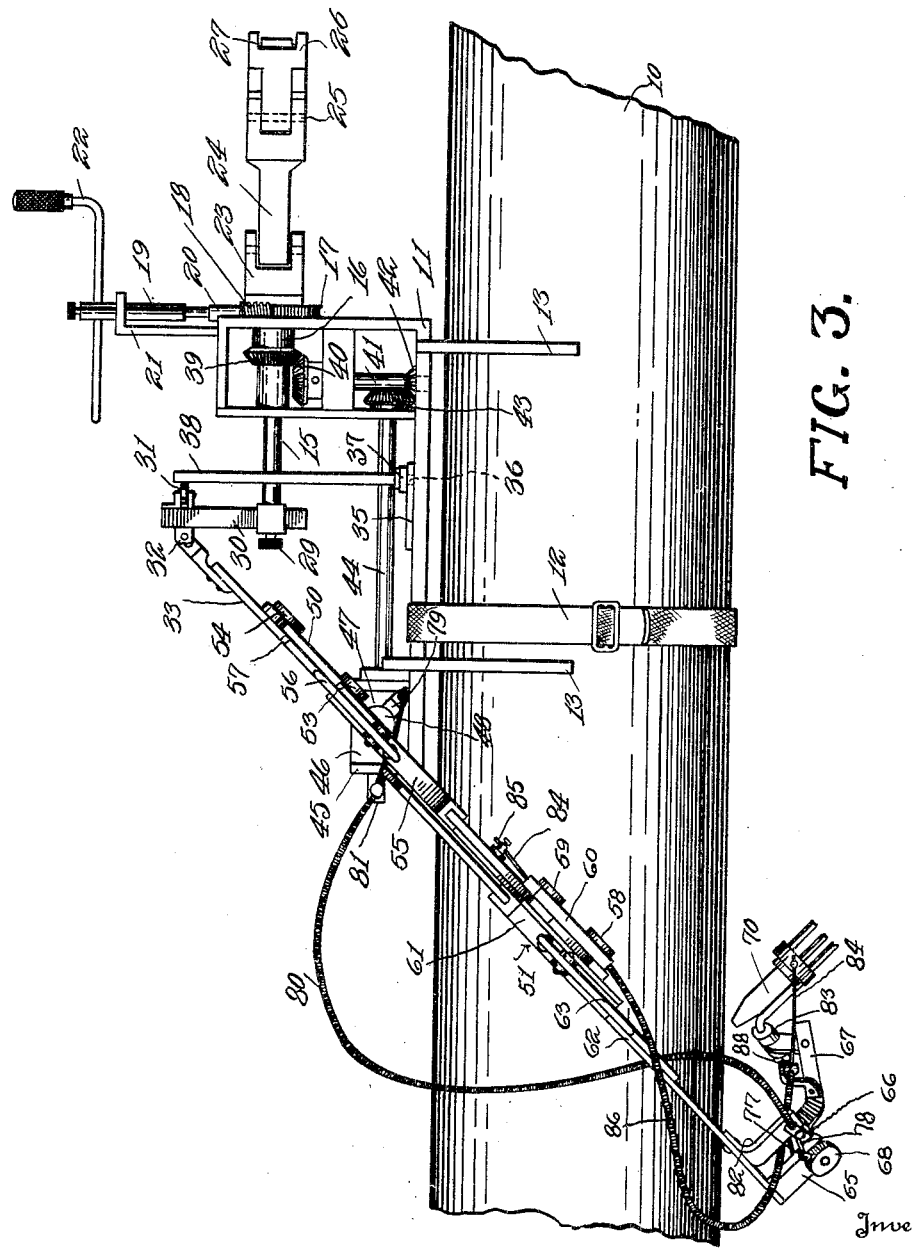

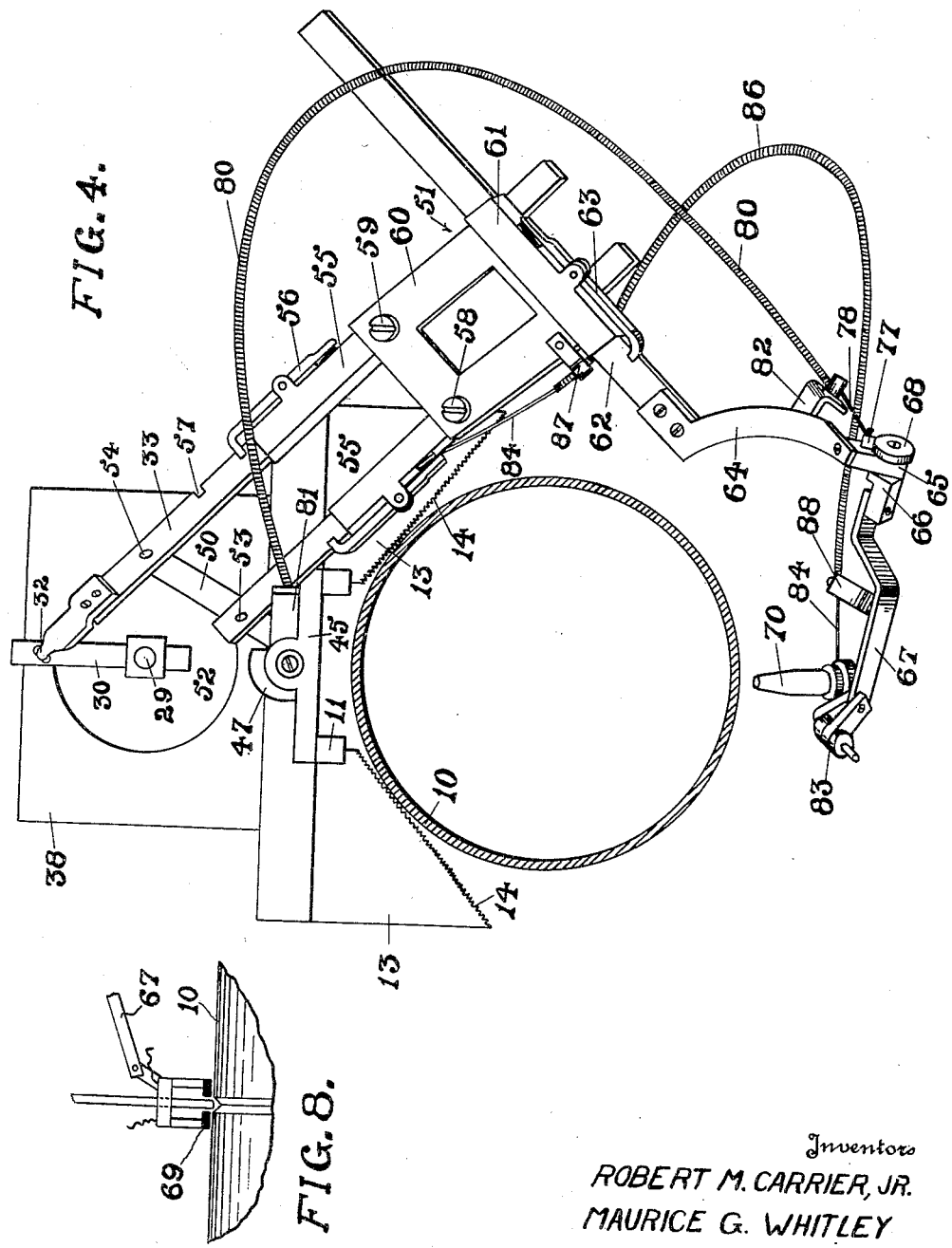

Patented Oct. 6, 1931

1,826,164

UNITED STATES PATENT OFFICE

ROBERT M. CARRIER, JR., AND MAURICE G. WHITLEY, OF LOUISVILLE, KENTUCKY

APPARATUS FOR THE GUIDING OF TOOLS IN THREE DIMENSIONS

Application filed February 5, 1931. Serial No. 513,760.

This invention relates to apparatus for mechanically and automatically guiding the movements of tools in three dimensions. The tool so guided may be of any suitable variety but, as illustrated and described, it is primarily intended to be a metal-working tool for cutting or welding. If a cutting tool, it may be operated electrically, or by gas, such as the usual oxy-acetylene blow torch. The welding tool may likewise be of any suitable variety. These are the tools most likely to be used with the invention, and metal the most probable material upon which they will be used, but it is understood that any suitable tool for the working of any suitable material shall be included under the terms as used throughout the specification and claims, though the description will be limited essentially to an oxy-acetylene blow torch as used in the cutting of metal pipe.

It is the object of the invention to provide a device which will mechanically guide a tool over and around a cylindrical object, such as pipe or solid bar stock, so that any desired cut or weld or marking may be made mechanically on such object. For example, by use of the adjustments possible, any cut known in the art may be made on any size of metal pipe. The cut may be made squarely across or at any angle, in a straight line or in any desired curve. The circular cuts necessary for what is known as a T-joint may also be made in the same way, and for the joining of any desired size or pipe, such as a smaller pipe to a larger one.

In the art of welding pipe end to end it is judged preferable to have the edges cut beveled or scarfed, so that when brought together there is left a V-shaped groove which may then be filled in with the welding metal. It is a second object of the invention, therefore, to provide for automatically beveling the pipe as the cutter passes around it.

Hand cutting by means of a blow torch invariably leaves edges more or less irregular, due to the uncertainty of the human control, and this necessitates either another cut or subsequent filing and reworking before the edges are ready for welding. Also, it is customary in hand cutting to first cut squarely on a marked line and then re-cut to get the bevel. For marking the lines in the usual practice of pipe cutting, about two hundred templates are needed and the time loss and confusion caused by carrying so many and sorting them for the special one wanted, amount to considerable. It is an object of the invention to eliminate these undesirable features. By virtue of its automatic movement it leaves a smooth and regular surface ready for welding, and does this with a single cut. The number of templates is reduced to a very few, since these few are adjustable.

It is a further object to provide a mechanical pantographic control means for the tool which will, being guided by a selected and adjusted template, guide the tool in a three-dimensional path proportionately larger or smaller as determined by the adjustment of the pantographic control means.

It is still another object of the invention to provide simple adjustments whereby the operator may set the device to work in the various ways described hereinafter, and whereby different cuts or welds may be made without removing the apparatus from the object on which it is operating.

Other objects and advantages of the invention will become apparent from the following detailed description of the preferred form of the apparatus.

In the drawings, Fig. 1 is a lateral view of the apparatus shown mounted on a section of pipe;

Fig. 2 is a top view of the apparatus, as shown in Fig. 1;

Fig. 3 is a lateral view showing the position of the apparatus when the tool has reached the bottom of its path;

Fig. 4 is an end view of the apparatus when in the position shown in Fig. 3, some details in the background being omitted;

Fig. 5 is a lateral view showing the use of a different kind of template;

Fig. 6 is a top view of the apparatus as shown in Fig. 5;

Fig. 7 is a partially sectional view showing a modification of the apparatus used for completing circular cuts or welds; and Fig. 8 shows the installation of a welding device, instead of the cutter shown in the other views.

Referring more particularly to the drawings, 10 is a metal pipe on which the frame 11 of the apparatus is suitably fastened as by a strap 12. Integral with, or rigidly secured to the frame 11 are angular supports 13 supplied with corrugations or teeth 14 which serve to grip the pipe 10 more closely. It has been discovered that the angle of 49 degrees is the proper one for these angular supports 13, for a purpose to be disclosed hereinafter Carried on the frame 11 is the mechanism proper, characterized by a main shaft 15 which transmits motion to the tool-guiding means as follows:—

The shaft 15 is supported by a sleeve bearing 16 which allows the shaft both a rotative and reciprocal movement. Shaft 15 is caused to rotate by means of a worm wheel 17 which is rigidly attached to sleeve bearing 16, the worm wheel being driven by a worm 18 terminating a shaft 19 having bearings in a sleeve 20 and an arm 21. Shaft 19 is revolved as by the removable crank 22. Rigidly secured to the worm wheel 17 and turning therewith is a forked member 23 on which is pivoted a forked arm 24. Arm 24 is pivoted at 25 to a second forked arm 26, which is fastened at 27 to the shaft 15, so that as will readily be seen the arms 24 and 26 do not in any way interfere with a reciprocatory movement of the shaft 15. And since the sleeve bearing 16, worm wheel 17, forked member 23, and arms 24 and 26 all turn as a unit, it will be understood that there results a double controlled movement of the main shaft 15. Carried on the shaft 15 is a compression spring 28 which tends always to push the shaft 15 in a direction away from the bearing 16 and so to straighten the hinged arms 24 and 26.

Removably and adjustably attached to shaft 15, as by the set screw 29, is an arm 30 carrying a guide, shown preferably as a roller 31. Also carried by the arm 30 is a universal joint 32 to which is swivelled a ratio arm 33, hereinafter to be described in detail.

On the frame 11 is adjustably fastened, as by bolt 34, a plate 35 which is provided with holes or slots 36. These holes 36 furnish anchoring means for the legs 37 of the removable template 38.

Though the operation of the entire apparatus will hereinafter be explained in detail, it is pointed out here for purposes of clarity that when the crank 22 is revolved, the motion is transmitted through the worm and worm wheel to the sleeve bearing 16 and forked member 23, and thence to the shaft 15 through the forked arms 24 and 26 and the attachment at 27. Arm 30 necessarily turns with shaft 15 and carries the roller 31 about the template 38, the roller being always held against the template by means of the pushing action of spring 28. It will be seen that roller 31 travels in a circular path and that the template 38 merely gives a reciprocatory movement to the shaft 15. Also, as the arm 30 revolves it carries with it the universal 32 and likewise the end of ratio arm 33 which is swiveled to the universal.

Carried on the sleeve bearing 16, and turning with it and the shaft 15, is a mitre gear 39 meshing with a second mitre gear 40 of equal ratio. Mitre gear 40 terminates the upper end of a shaft 41, at the lower end of which is another mitre gear 42 of half the ratio of gears 39 and 40. Gear 42 meshes with a gear 43 of equal ratio to gears 39 and 40, gear 43 being secured to a shaft 44. Thus shaft 44 is driven simultaneously with shaft 15, but at only half its speed.

In a bearing 45 on the frame 11 is a universal 46 to which is rigidly fastened the shaft 44. Universal 46 is comprised of a semi-cylindrical member 47 which of course revolves with shaft 44, a slotted stem 48 turning with the member 47 and also revolving freely on its vertical axis, and a pin 49 forming the hinge for an arm 50 which, from the combined movements of universal 46, is allowed motion in three directions.

Thus the universals 32 and 46 comprise two freely moving anchorages for the ratio arm or pantographic arrangement designated in its entirety by the reference number 51. An arm 52 extends parallel to arm 33. The arm 50 is pivoted at 53 to arm 52 and is pivoted at 54 to arm 33. On the arms 52 and 33 are movable sleeves 55 held in fixed position by the adjustments 56 which are set in any one of a plurality of recesses 57. Pivoted at 58 and 59 to the sleeves 55 is a member 60 in the shape of a parallelogram having a sleeve bearing 61 in which is adapted to slide an arm 62. The position of arm 62 is determined by an adjustment 63 similar to adjustments 56 on arms 33 and 52. Arm 62 curves forwardly and downwardly at its lower end, as shown at 64, and has rigidly secured, at right angles to its tip, a short arm 65. Pivoted in the arm 65 is a composite integral member comprising a lug 66 and a disk 68, an arm 67 being pivotally mounted on the lug 66. On the end of arm 67 is pivoted the tool, which may be either the welding device shown in Fig. 8 at 69, or the oxy-acetylene cutting torch shown in the rest of the figures at 70, or it may be any other suitable form not shown. Attached to arm 65 and bearing against arm 67 is a spring 67$^a$. When the tool 70 has reached the position shown in Fig. 4 there is a tendency for arm 67 to sag on its pivot on lug 66, which sagging the spring 67$^a$ is designed to prevent.

The template 38 shown in Figs. 1, 2, 3 and 4 consists of a flat plate which may be set at any angle desired. Plate 35 turns on a section of the frame 11 which is supplied with indicia 35ª, the indicia comprising radiating lines at different angles on which the edge of the plate 35 may be set. As shown in Fig. 1, it is set at an angle of approximately 15 degrees, and the resulting path of the tool is indicated on the pipe 10 by the dotted line 71, Fig. 1. Fig. 5 shows at 72 the use of another type of template which is mounted in place of template 38. In this case the roller 31 takes a double circular path about a projecting pathway 73 the purpose of which is to prevent the roller from slipping at the start and finish of its rotation. The use of template 72 as in Fig. 5 causes the tool to follow the curved path shown by dotted line 74, Fig. 1, which comprises a half of the male T cut. It also cuts a similar curved path on the other side of the pipe to complete the male T.

Fig. 7 shows a modification of the apparatus as used for making the female T cut, dotted lines 74 and 75 of Fig. 1. The circle is cut from only one side of the pipe. The parts present in this modification function similarly to those shown in Fig. 1, and the same reference numerals are therefore employed for analogous parts. In this modification, however, there is no need for the mitre gears on the sleeve bearing 16, since the cut is being made over only half of the surface of the pipe, which can be reached without leaning the guide arm. In this construction the roller 31 describes a circular path about the template 76 and the reciprocal movement of the shaft 15 is gotten from the curved inner surface of the template itself, though the raised pathway 73 is still necessary. If desired, the construction shown in Fig. 7 may be combined with that shown in the rest of the figures, and both cuts or welds 74 and 75 made without shifting the mechanism. All that is necessary is to set up template 76 and shift the crank 22.

As shown, the torch 70 is tilted to an angle of approximately 45 degrees to give the beveled cut desirable for subsequent welding. But as the ratio arm 52 carries the torch around the curved surface of the pipe, this angle would naturally change in relation to the surface. Also, the bent arm 67 carrying the torch would have no tendency to turn and would carry the tip of the cutter away from the pipe. In the process of cutting the pipe from bottom to top, it is necessary for arm 67 to turn 180 degrees on its pivot. This is in order to keep the center line of the torch parallel to a radius of that circle formed by a cross-section of the pipe, which must naturally be done if the cutting flame is to be effective. Thus two automatic adjustments are necessary and to effect these, and maintain the necessary angles at all times, we have provided novel means as follows.

The arm 67, in its path from the bottom to the top of the pipe, describes a semi-circle and the tool carried by it must always point toward the center of the circle formed by a cross section of the pipe. To effect the turning, which must be steady and proportional, positive driving means are required. The driving power is taken from the universal 46, which is connected to a projection 77 of the disk 68. The connection, which may be regarded as the equivalent of shafts and driving gears, comprises a flexible wire 78 rigidly bound at one end to the projection 77 and at the other to an arm 79 which is rigidly attached to the slotted stem 48. Enclosing the wire 78 is a flexible tube 80, which is rigidly bound to an arm 81 and to a second arm 82. Arm 81 is rigidly attached to the semi-cylindrical member 47 of the universal 46, and arm 82 is attached to arm 62 of the ratio 51. The wire 78 is free to slide within the tube 80. When the tool 70 is moved from its position in Fig. 1 to that shown in Figs. 4 and 3, the compound movements of the universal 46 total 180 degrees, which is the movement desired for the arm 67. Wheel 31 covers a half-circle, or 180 degrees, on the template 38. Likewise the end of arm 33 covers the same half-circle. Because it is driven at half the speed of shaft 15, as described, shaft 44 has turned 90 degrees, and so tipped the member 47 a quarter-circle. But as the tool travels about the pipe, arm 50 necessarily twists and turns the stem 48 on its vertical axis, and with it the arm 79. This movement of the arm 79 covers 90 degrees, which when added to the 90 degree turn of member 47 totals the 180 degree movement of the tool. Tube 80 bends to compensate the lengthening of ratio arm 51, and within it slides wire 78. So as arm 79 turns in a quadrant it pulls wire 78 through tube 80 and thus twists the disk 68, which turns arm 67.

The tool 70 is pivoted at 83 to the arm 67 in order that any angle may be set for it. To keep this angle constant in relation to the surface of the pipe, an adjustment similar to that described for arm 67 is used. A flexible wire 84 is rigidly attached at one end to the tool, and at the other to an attachment 85 on the arm 52. It slides in a flexible tube 86 which is rigidly held at one end by an attachment 87 on the member 60, and at the other end by a similar attachment 88 on arm 67. Thus as the distance between attachments 87 and 88 becomes greater, the flexibility of tube 86 allows it to take care of this change by bending. The change in distance is proportional to the curvature of the pipe 10, and the change of angle presented by the tool is proportional to both. As the ratio arm 51 extends itself to carry the tool to the lower side of the pipe, wire 84 is pulled through tube 86 and so draws the upper end of the tool forward, maintaining the angle determined upon when wire 84 is set. Thus these two automatic adjustments keep the tool at all times in cutting relation to the pipe, and also maintain any desired bevel of cut all around the pipe. Before operation, assuming the oxy-acetylene blow torch to be attached, several adjustments must be made. First, the ratio arm 51 is set for the size of pipe to be cut, by means of adjustments 56 and 63. Next, the proper template must be selected and set in place. If the pipe is to be cut at an angle, the template 38 is inserted and the plate 35 is turned to the desired angle as measured by the indicia 35ª on the frame 11. If a bevel is wanted, as is generally the case, the wire 84 is lengthened or shortened between its binding terminals to bring the torch to the proper angle with relation to the pipe. In making angle cuts, it is preferable to start at the bottom of the pipe and work up both sides, so at the start the ratio arm will be moved until the torch is in the position shown in Fig. 4. The device is now ready for cutting. The crank 22 is turned at any suitable speed and the shafts 15 and 44 turn with it. Shaft 15 carries the roller or guide 31 in a circular path about the template. The spring 28 at all times holds the guide against the template, giving a reciprocal movement to the shaft as determined by the selected angle of the template, and a corresponding movement to the ratio arm, and, at half the speed of shaft 15, the shaft 44 revolves, turning with it member 47 of the universal 46, and thus tilting the arm 51 gradually sidewise until the torch 70 is allowed to reach the position shown in Fig. 4. At the start, as may be seen in Fig. 4, the roller 31 is at the top of its path and the torch is at the bottom of the pipe. With the turning of crank 22, the torch is brought around and up the pipe, along the angle determined by the template. Arm 67 turns on its pivot to correct the change in angle in relation to the surface of the pipe, and wire 84 adjusts and keeps relatively constant the beveling angle of the torch. When the other half of the pipe is cut, it is preferable to return the torch to the bottom of the pipe.

The supporting members 13 are given inner faces 49 degrees from the vertical. This angle, it has been found, is the proper one to support the apparatus at the correct height on any size of pipe from four inches up. Universal 32, pin 49 of universal 46, and the striking point of the torch flame are always in the same plane, no matter what the size of the pipe.

Though we have shown and described our invention in its preferred form, it is understood that many minor modifications of the parts may be employed to attain the same result, and it is not intended that the invention shall be limited to the precise structure shown, further than the language of the appended claims renders such limitation necessary.

Having thus described our invention what we claim as new is:—

1. Apparatus of the class described which comprises a template, a guide designed to traverse the template, a tool, and adjustable means for so connecting the guide and the tool that the tool is guided in a three-dimensional path determined by the template and by the said adjustable connecting means.

2. Apparatus of the class described comprising a template, a guide designed to traverse the template, means for transmitting motion to the guide, a tool, and adjustable means for so transmitting the motion of the guide to the tool that it is guided in a three-dimensional path determined by the template and by the said adjustable transmitting means.

3. Apparatus of the class described comprising a template, a guide designed to traverse the template, a tool, adjustable means for so connecting the guide and the tool that the tool is guided in a three-dimensional path as determined by the template and by the said adjustable connecting means, and means for so transmitting motion to the said guide that it is forced to follow the template.

4. Apparatus of the class described comprising an adjustable and removable template providing a three dimensional path, a guide designed to traverse the template, a tool, and adjustable means for so connecting the guide and the tool that the tool is guided in the path determined by the template.

5. Apparatus for the mechanical cutting of a cylindrical object comprising a template providing a three dimensional path, a guide designed to traverse the template, a cutting tool, and pantographic adjustable means carrying the tool by which the three-dimensional path determined by the template and followed by the tool may be proportionately increased or decreased on the object to be cut.

6. Apparatus of the class described comprising a template providing a three dimensional path, a guide designed to traverse the template, a tool, and adjustable means connecting the guide and the tool whereby the tool is guided in the three-dimensional path determined by the template, such adjustable means comprising a ratio arm by which the length of the said path may be proportionately increased or decreased.

7. Apparatus for the mechanical guiding of a tool comprising a template providing a three dimensional path, a guide designed to traverse the template, a tool, an arm carrying the tool, adjustable ratio means connecting the said arm and the guide to move the tool in the three-dimensional path determined by the template and by the adjustable ratio means, and means for transmitting motion to the said guide and to the said adjustable ratio means.

8. Apparatus of the class described comprising a template, a guide designed to traverse the template, an arm carrying the said guide and designed both for rotative and reciprocatory movement on its longitudinal axis as the guide traverses the template, a tool, a second arm carrying the tool, adjustable ratio means connecting the said second arm and the guide to move the tool in the path determined by the template and by the said adjustable ratio means, and means for transmitting motion to the guide and for forcing it to follow the template.

9. Apparatus for the cutting of cylindrical objects comprising a template, a guide designed to traverse the template, an adjustable arm carrying the guide, such arm being so mounted as to receive both a rotative and reciprocatory movement on its longitudinal axis as the guide follows the template, an adjustable ratio arm, a universal joint connecting the said adjustable arm and the ratio arm, a tool carried by the ratio arm, means for maintaining the tool in fixed position relative to the surface of the object to be cut, and means for transmitting movement to the said adjustable arm carrying the guide.

10. Apparatus of the class described comprising a tool, a ratio arm carrying the tool, means for mechanically guiding the tool in a predetermined three-dimensional path, and means for automatically maintaining the angle of the tool constant relative to the path it traverses.

11. Apparatus of the class described comprising a tool, means for mechanically guiding the tool in a predetermined three-dimensional path, and means for automatically keeping constant the angles formed by the tool and the path it traverses, such means consisting of flexible adjustments between the tool and the said mechanical guiding means.

12. Apparatus of the class described comprising a template providing a three dimensional path, a guide designed to traverse the template, a cutting tool, adjustable means connecting the guide and the tool whereby the tool is guided in the three-dimensional path determined by the template, and adjustable means whereby the tool may be fixed and thereafter automatically held constantly at any desired cutting angle relative to the said path.

13. Apparatus of the class described comprising a tool, means for guiding the tool in a predetermined and proportional path, a base, and supporting members on the base adapted to contact the surface of the object to be cut, such supporting members having inner faces 49 degrees from the perpendicular.

14. Apparatus of the class described comprising an adjustable template providing a three-dimensional path, a guide adapted to traverse the template, a tool, a ratio arm so connecting the tool and the guide that the toll is guided in the path determined by the template, and a member on which the template is adapted to be adjusted, such member having indicia to mark the degree of adjustment.

15. Apparatus of the class described comprising a template providing a three-dimensional path, a guide adapted to traverse the template, a tool, an adjustable ratio arm so connecting the said guide and the tool that the tool is guided in the three-dimensional path determined by the template and the adjustment of the said ratio arm, and means for automatically maintaining the angle of the tool constant relative to the path it traverses.

16. Apparatus of the class described comprising a tool, adjustable means for guiding the tool in a three-dimensional path, and an adjustable ratio arm carrying the tool whereby the path traveled by the tool may be proportionately increased or decreased.

17. Apparatus of the class described comprising an adjustable template, a guide adapted to traverse the template, means for holding the guide to the template, an adjustable arm carrying the said guide, a tool, and adjustable means for guiding the tool in the three-dimensional path determined by the said template and by the said adjustable means.

18. Apparatus of the class described comprising an adjustable template, a guide adapted to traverse the template, means for holding the guide against the template, an adjustable arm carrying the said guide, a member on which the template is adapted to be adjusted, such member having indicia to mark the degree of adjustment, a tool, adjustable means connecting the tool with the said guide whereby the tool is guided in the three-dimensional path determined by the template, and an adjustable ratio arm carrying the tool, such ratio arm being adapted to proportionately increase or decrease the length of the path traveled by the tool.

19. Apparatus of the class described comprising a tool, adjustable means for guiding the tool in a predetermined three-dimensional path, and automatic means for maintaining the angle of the tool to the work relatively constant as it traverses its path, such means comprising flexible and adjustable controls connecting the tool and the said adjustable guiding means.

20. Apparatus of the class described which comprises a template providing a three-dimensional path, a guide designed to traverse the template, a tool, adjustable means connecting the guide and the tool whereby the tool is guided in the three-dimensional path determined by the template and by the said adjustable connecting means, and automatic means for maintaining the angle of the tool to the work relatively constant as it traverses its three-dimensional path.

21. Apparatus for guiding a tool in three dimensions comprising a template providing a three-dimensional path, a guide designed to traverse the template, a tool, adjustable means connecting the guide and the tool whereby the tool is guided in the three-dimensional path determined by the template, and an adjustable ratio arm carrying the tool whereby the path traveled by the tool may be proportionately increased or decreased.

22. Apparatus for guiding a tool in three dimensions comprising an adjustable template providing a three-dimensional path, a guide adapted to traverse the template, means for transmitting motion to the guide, a tool, adjustable means connecting the guide and the tool whereby the tool is guided in the three-dimensional path determined by the template, and an adjustable ratio arm carrying the tool whereby the path traveled by the tool may be proportionately increased or decreased.

23. Apparatus of the class described comprising an adjustable template, a guide adapted to traverse the template, means for holding the guide to the template, an adjustable arm carrying the guide, means for transmitting motion to the said adjustable arm, a tool, a ratio arm carrying the tool, means connecting the ratio arm to the said adjustable arm carrying the guide whereby the motion of the guide is transmitted to the ratio arm and to the tool, and adjustments on the ratio arm whereby the path determined by the template may be proportionately increased or decreased.

24. Apparatus of the class described comprising a template providing a three-dimensional path, a guide adapted to traverse the template, a tool, adjustable means connecting the tool and the guide whereby the tool is guided in the three-dimensional path determined by the template, and an arm carrying the said guide, such arm being adjustable to vary the length of the path described by the said guide.

25. Apparatus for guiding a tool in three dimensions which comprises a template providing a three-dimensional path, a guide adapted to traverse the template, an arm carrying the guide, such arm being adjustable to vary the length of the path described on the template by the guide, means for transmitting motion to the said arm, a tool, and adjustable means connecting the tool and the guide whereby the tool is guided in the three-dimensional path determined by the template.

26. Apparatus for guiding a tool in three dimensions which comprises an adjustable ratio arm carrying the tool, and means for so guiding the said arm that the tool is carried in a predetermined three-dimensional path.

27. Apparatus for guiding a tool in a three-dimensional path about a cylindrical object which comprises a ratio arm carrying the tool, and means for so tilting the arm that the tool is carried about the cylindrical object.

In testimony whereof we hereunto affix our signatures.

R. M. CARRIER, JR.
M. G. WHITLEY.